US011327743B2

(12) United States Patent
Kruempelmann et al.

(10) Patent No.: US 11,327,743 B2
(45) Date of Patent: May 10, 2022

(54) TRANSPORTATION OF CONFIGURATION DATA ACROSS MULTIPLE CLOUD-BASED SYSTEMS

(71) Applicant: SAP SE, Walldorf (DE)

(72) Inventors: Wulf Kruempelmann, Altlussheim (DE); Barbara Freund, Heidelberg (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/198,515

(22) Filed: Nov. 21, 2018

(65) Prior Publication Data

US 2020/0159524 A1 May 21, 2020

(51) Int. Cl.
G06F 8/71 (2018.01)
G06F 8/65 (2018.01)
G06F 16/22 (2019.01)

(52) U.S. Cl.
CPC .............. G06F 8/71 (2013.01); G06F 8/65 (2013.01); G06F 16/2282 (2019.01)

(58) Field of Classification Search
USPC ......................................... 717/121, 168–178
See application file for complete search history.

(56) References Cited

U.S. PATENT DOCUMENTS

| 6,385,770 | B1* | 5/2002 | Sinander | G06F 8/656 717/170 |
| 8,108,431 | B1* | 1/2012 | Guner | G06F 16/24561 707/792 |
| 2002/0057837 | A1* | 5/2002 | Wilkinson | G06F 9/3004 382/187 |
| 2002/0059280 | A1* | 5/2002 | Slesinsky | G06F 16/284 |
| 2002/0129356 | A1* | 9/2002 | Hellerstein | G06F 8/61 717/177 |
| 2003/0055835 | A1* | 3/2003 | Roth | G16B 50/00 |
| 2003/0225741 | A1* | 12/2003 | Herzog | H04L 67/306 |
| 2005/0278341 | A1* | 12/2005 | Kostadinov | G06F 8/65 |
| 2006/0174241 | A1* | 8/2006 | Celadnik | G06F 8/71 717/170 |
| 2006/0265702 | A1* | 11/2006 | Isaacson | G06F 8/61 717/168 |
| 2008/0071812 | A1* | 3/2008 | Baby | G06F 17/2211 |

(Continued)

*Primary Examiner* — Jason D Mitchell
(74) *Attorney, Agent, or Firm* — Mintz Levin Cohn Ferris Glovsky and Popeo, P.C.

(57) ABSTRACT

A method for transporting configuration data may include determining that a customization created at a development system for a software application is being deployed at a production system hosting the software application. In response, a transport request including the customization may be verified to determine whether errors are present in the transport request. The errors may include dependent data that is required to deploy the customization at the production system being absent from the transport request. If errors are present in the transport request, a request for a corrected transport request may be sent to the development system. The customization included in the corrected transport request may be deployed at the production system by applying, to a configuration of the software application, the customization included in the corrected transport request. Related systems and articles of manufacture, including computer program products, are also provided.

12 Claims, 6 Drawing Sheets

(56) References Cited

U.S. PATENT DOCUMENTS

| | | | |
|---|---|---|---|
| 2008/0301668 A1* | 12/2008 | Zachmann | G06F 8/656 |
| | | | 717/173 |
| 2009/0164970 A1* | 6/2009 | Gentry | G06F 8/71 |
| | | | 717/101 |
| 2010/0070961 A1* | 3/2010 | Auer | G06F 8/65 |
| | | | 717/168 |
| 2011/0047527 A1* | 2/2011 | Bird | G06F 8/30 |
| | | | 717/107 |
| 2011/0131549 A1* | 6/2011 | Bozak | G06F 8/71 |
| | | | 717/121 |
| 2011/0225217 A1* | 9/2011 | Plax | G06F 16/2282 |
| | | | 707/825 |
| 2012/0131154 A1* | 5/2012 | Kruempelmann | G06Q 10/00 |
| | | | 709/220 |
| 2013/0159259 A1* | 6/2013 | Hobbs | G06Q 10/10 |
| | | | 707/690 |
| 2014/0173362 A1* | 6/2014 | Kaiser | G06F 8/65 |
| | | | 714/47.2 |
| 2015/0355899 A1* | 12/2015 | Agarwal | G06F 8/658 |
| | | | 717/170 |
| 2016/0253170 A1* | 9/2016 | Fardig | G06F 8/658 |
| | | | 717/170 |
| 2017/0003951 A1* | 1/2017 | Newell | G06F 8/70 |
| 2018/0074816 A1* | 3/2018 | Moss | G06F 8/71 |

* cited by examiner

TRANSPORTATION OF CONFIGURATION DATA ACROSS MULTIPLE CLOUD-BASED SYSTEMS

TECHNICAL FIELD

The present disclosure generally relates to cloud computing and, more specifically, to the transportation of configuration data.

BACKGROUND

An application may be hosted by a cloud-computing platform such that the application may be remotely accessible to multiple tenants, for example, over the Internet. For example, the application may be available as a cloud-based service including, for example, a software as a service (SaaS) and/or the like. Many organizations may rely on such cloud-based software applications including, for example, enterprise resource planning (ERP) software, customer relationship management (CRM) software, and/or the like. These cloud-based applications may provide a variety of data processing functionalities including, for example, payroll, time and attendance management, recruiting and onboarding, learning and development, performance and compensation, workforce planning, and/or the like.

SUMMARY

Methods, systems, and articles of manufacture, including computer program products, are provided for transporting configuration data across multiple cloud-based systems. In one aspect, there is provided a system including at least one processor and at least one memory. The at least one memory can store instructions that cause operations when executed by the at least one processor. The operations may include: determining that a customization to a software application is being deployed at a production system hosting the software application, the customization being created at a development system having a different configuration than the production system, and the customization including an addition, a removal, and/or a modification of one or more database tables; in response to determining that the customization is being deployed to the production system, verifying a transport request including the customization, the verification comprising determining whether one or more errors are present in the transport request, and the one or more errors including dependent data that is required to deploy the customization at the production system being absent from the transport request; in response to determining that one or more errors are present in the transport request, sending, to the development system, a first request for a corrected transport request; and deploying, at the production system, the customization included in the corrected transport request by at least applying, to a configuration of the software application, the customization included in the corrected transport request.

In some variations, one or more of the features disclosed herein including the following features can optionally be included in any feasible combination. The customization may be created based on another instance of the software application at the development system. The other instance of the software application may be associated with a different configuration than the software application at the production system.

In some variations, the customization may include an addition of a first database table to the configuration of the software application. The first database table may store a first data that enables a functionality to be performed by the software application. The dependent data may include a second database table storing a second data that is also required by the software application to perform the functionality. The corrected transport request may include the second database table.

In some variations, the one or more errors may be determined based at least on a data dictionary storing a dependency between the first database table and the second database table. The data dictionary may store the dependency between the first database table and the second database table by at least storing keys mapping entries from the first database table to entries in the second database table.

In some variations, a second request may be sent to the development system in order to obtain, from the development system, at least a portion of the data dictionary.

In some variations, the one or more errors include the dependent data being absent from the production system.

In some variations, the one or more errors further include a removal, from the production system, of a first data but not a second data required by the software application to perform an existing functionality.

In some variations, the software application may operate on data stored in the one or more database tables.

In another aspect, there is provided a method for transporting configuration data across multiple cloud-based systems. The method may include: determining that a customization to a software application is being deployed at a production system hosting the software application, the customization being created at a development system having a different configuration than the production system, and the customization including an addition, a removal, and/or a modification of one or more database tables; in response to determining that the customization is being deployed to the production system, verifying a transport request including the customization, the verification comprising determining whether one or more errors are present in the transport request, and the one or more errors including dependent data that is required to deploy the customization at the production system being absent from the transport request; in response to determining that one or more errors are present in the transport request, sending, to the development system, a first request for a corrected transport request; and deploying, at the production system, the customization included in the corrected transport request by at least applying, to a configuration of the software application, the customization included in the corrected transport request.

In some variations, one or more of the features disclosed herein including the following features can optionally be included in any feasible combination. The customization may be created based on another instance of the software application at the development system. The other instance of the software application may be associated with a different configuration than the software application at the production system.

In some variations, the customization may include an addition of a first database table to the configuration of the software application. The first database table may store a first data that enables a functionality to be performed by the software application. The dependent data may include a second database table storing a second data that is also required by the software application to perform the functionality. The corrected transport request may include the second database table.

In some variations, the one or more errors may be determined based at least on a data dictionary storing a dependency between the first database table and the second database table. The data dictionary may store the dependency between the first database table and the second database table by at least storing keys mapping entries from the first database table to entries in the second database table.

In some variations, the method may further include sending, to the development system, a second request in order to obtain, from the development system, at least a portion of the data dictionary.

In some variations, the one or more errors include the dependent data being absent from the production system.

In some variations, the one or more errors further include a removal, from the production system, of a first data but not a second data required by the software application to perform an existing functionality.

In another aspect, there is provided a computer program product that includes a non-transitory computer readable medium. The non-transitory computer readable medium may store instructions that cause operations when executed by at least one data processor. The operations may include: determining that a customization to a software application is being deployed at a production system hosting the software application, the customization being created at a development system having a different configuration than the production system, and the customization including an addition, a removal, and/or a modification of one or more database tables; in response to determining that the customization is being deployed to the production system, verifying a transport request including the customization, the verification comprising determining whether one or more errors are present in the transport request, and the one or more errors including dependent data that is required to deploy the customization at the production system being absent from the transport request; in response to determining that one or more errors are present in the transport request, sending, to the development system, a first request for a corrected transport request; and deploying, at the production system, the customization included in the corrected transport request by at least applying, to a configuration of the software application, the customization included in the corrected transport request.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the transportation of configuration data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

A cloud-based software application may operate on data stored in one or more database tables. As such, the cloud-based software application may be implemented based on a template that defines the one or more database tables including, for example, the manner in which data is stored in the database tables. Since the cloud-based software application may be delivered to different tenants with a set of default templates, each tenant may be required configure the cloud-based software application by at least selecting, based on individual requirements, at least one of the default templates before applying, to the selected templates, one or more customizations. These customizations may be created in a development system prior to being deployed to a production system. However, the configurations at the development system may not necessarily be synchronized with the configurations at the production system. For example, during operation of the development system, the configuration of the production system may undergo changes such that the customizations may be developed based on different configurations at the development system. Thus, errors may be present in the customizations created in the development system, which may subsequently prevent these customizations from being successfully deployed to the production system.

In order to deploy one or more customizations to a production system, a development system may send, to the production system, a transport request. The transport request may include the one or more customizations. Deploying the one or more customizations to the production system may include applying the one or more customizations to a corresponding template at the production system. As noted, the cloud-based software application may operate on data stored in one or more database tables, which may be defined by a template. Accordingly, the one or more customizations may include an addition and/or removal of a database table defined by the template. Alternatively and/or additionally, the one or more customizations may include a change to the manner in which data is stored in the one or more database tables as defined by the template.

In some example embodiments, a transport controller may be configured to verify the transport request before the one or more customizations included in the transport request are deployed to the production system. The transport controller may be configured to determine, for instance, whether one or more errors are present in the transport request that would prevent the one or more customizations from being successfully deployed to the production system. For example, the one or more errors may include an absence and/or removal of dependent data that is required for the cloud-based software application at the production system to operate in accordance with the customizations. The transport controller may prevent a transport request containing errors from being accepted at the production system. Moreover, the transport controller may send, to the development system, a request to modify the transport request to correct the errors that are present in the transport request. For instance, the transport controller may request the development system to extend the transport request to include dependent data that is absent from the transport request but is required for the deployment of the one or more customizations to the production system.

Figure 1:
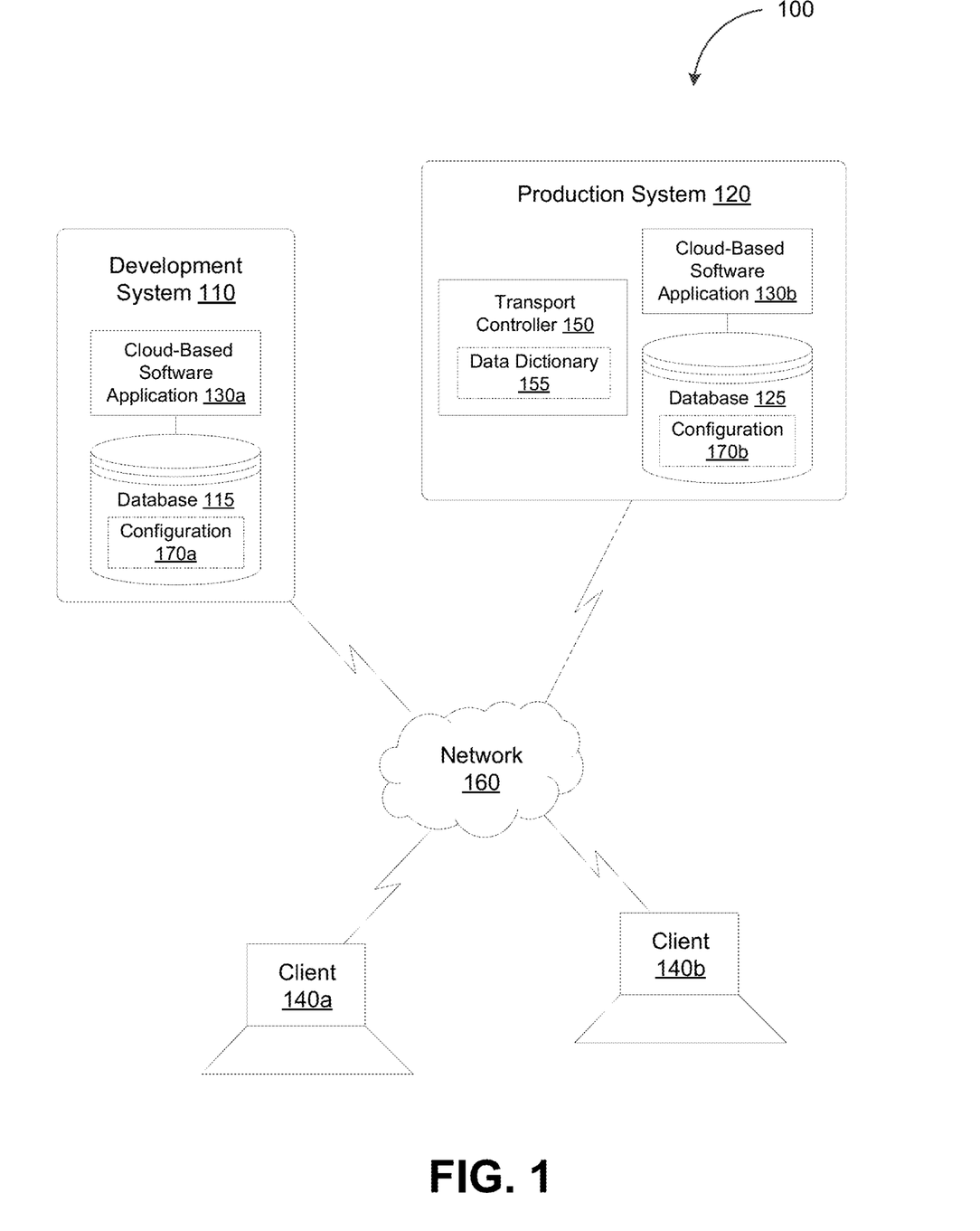
FIG. 1 depicts a system diagram illustrating a configuration data transport system, in accordance with some example embodiments.

FIG. 1 depicts a system diagram illustrating a configuration data transport system 100, in accordance with some example embodiments. Referring to FIG. 1, the configuration data transport system 100 may include a development system 110, a production system 120, a first client 140a, and a second client 140b. As shown in FIG. 1, the development system 110, the production system 120, the first client 140a, and the second client 140b may be communicatively coupled via a network 160. It should be appreciated that the network 160 may be any wired and/or wireless network including, for example, a wide area network (WAN), local area network (LAN), a virtual local area network (VLAN), the Internet, and/or the like. Moreover, the development system 110 and/or the production system 120 may be cloud-based systems hosted on a same cloud-computing platform or different cloud computing platforms.

Referring again to FIG. 1, the development system 110 may host a first cloud-based software application 130a while the production system 120 may host a second cloud-based software application 130b. The first cloud-based software application 130a and the second cloud-based software application 130b may be instances of the same cloud-based application including, for example, an enterprise resource planning (ERP) software application, a customer relationship management (CRM) software application, a supply chain management (SCM) software application, and/or the like. Accordingly, the first cloud-based software application 130a and the second cloud-based software application 130b may provide a variety of data processing functionalities including, for example, procurement, payroll, time and attendance management, recruiting and onboarding, learning and development, performance and compensation, workforce planning, and/or the like.

In some example embodiments, the development system 110 and the production system 120 may each be configured to perform periodic health checks in order to detect errors at a local system and/or a remote system. For example, the development system 110 may perform a health check at the development system 110 and/or the production system 120 by at least performing a heartbeat check at the development system 110 and/or the production system 120. Alternatively and/or additionally, the production system 120 may perform a health check at the production system 120 and/or the development system 110 by at least performing a heartbeat check at the development system 110 and/or the production system 120. The development system 110 and/or the production system 120 may report, to a central management system, a result of the health checks. For instance, the development system 110 may alert the central management system to the presence of local errors at the development system 110 and/or remote errors at the production system. Likewise, the production system 120 may also alert the central management system when the production system 120 detects the presence of local errors at the production system 120 and/or remote errors at the development system 110.

A developer associated with the first client 140a may access the development system 110 in order to develop one or more customizations for the first cloud-based software application 130a. These customizations may add, remove, and/or modify at least some of the functionalities of the first cloud-based software application. Moreover, deploying these customizations may include applying the customizations to the second cloud-based software application 130b at the production system 120. A customer associated with the second client 140b may access the production system 120 in order to utilize one or more of the functionalities provided by the second cloud-based software application 130b. The customizations that are applied to the second cloud-based software application 130b may add, remove, and/or modify the corresponding functionalities at the second cloud-based software application 130b.

A transport request may be sent from the development system 110 to the production system 120 in order to deploy, at the production system 120, one or more customizations that are created at the development system 110. The first cloud-based software application 130a and the second cloud-based software application 130b may operate on data stored in one or more database tables. Accordingly, the first cloud-based software application 130a and the second cloud-based software application 130b may be implemented based on a template defining the one or more database tables. Moreover, the one or more customizations may include, for example, an addition and/or removal of a database table defined by a template. Alternatively and/or additionally, the one or more customizations may include a change to the manner in which data is stored in the one or more database tables as defined by the template.

Referring again to FIG. 1, the development system 110 may store one or more templates as part of a first configuration 170a stored in a first database 115 at the development system 110. The developer associated with the first client 140a may create, based on the first configuration 170a, one or more customizations for the first cloud-based software application 130a. Deploying the one or more customizations from the development system 110 to the production system 120 may include modifying, in accordance with the one or more customizations, a second configuration 170b stored in a second database 125 at the production system 120. The second configuration 170b may include one or more templates that define the manner in which data is stored in the database tables that are operated upon by the second cloud-based software application 130b.

Table 1 below depicts pseudo programming code for a template defining the manner in which data is stored in a database table. In the example shown in Table 1, the template may include Extensible Markup Language (XML) defining the manner in which data is stored in a database table. However, it should be appreciated that the template may include a different representation of the manner in which data is stored in a database table including, for example, JavaScript Object Notation (JSON), Hypertext Markup Language (HTML), and/or the like.

TABLE 1

```
<item>
<object_name> manufacturing method </object_name>
<object_type> table_content</object_type>
<table_name>tab_manufacuring</table_name>
<field> method</field>
<content>batch</content>
<field>product</field>
<content>medicine</content>
</item>
```

Although the first cloud-based software application 130a at the development system 110 and the second cloud-based application 130b at the production system 120 may be instances of the same cloud-based software application, the first configuration 170a of the first cloud-based software application 130a may not be synchronized with the second configuration 170b of the second cloud-based software application 130b. As such, customizations that are developed at the development system 110 based on the first configuration 170a may include one or more errors may subsequently prevent these customizations from being successfully deployed at the production system 120. These errors may include an absence and/or removal of dependent data that is required for the second cloud-based software application 130b at the production system 120 to operate in accordance with the customizations. For instance, an error may be present in the transport request that include the addition of a first database table that enables the second cloud-based software application 130b to perform a functionality if a second database table storing data that is also required by the second cloud-based software application 130b to perform the functionality is absent from the transport request.

For example, the customizations created at the development system 110 may include the addition of a first database table storing exchange rates between different currencies, which may enable the second cloud-based software application 130b to perform an exchange rate conversion between different currencies. However, in order for the second cloud-based software application 130b to operate in accordance with these customizations, the transport request may be required to include dependent data such as, for example, a definition of the currencies if such definitions are not already part of the second configuration 170b at the production system 120. The definition of currencies may be stored in a second database table. As such, an error in the transport request may include an absence of the second database table storing the definition of the currencies, which may be required for the second cloud-based software application 130b to perform the exchange rate conversion between different currencies. Alternatively and/or additionally, the customizations created at the development system 110 may include a removal of the second database table storing the definition of one or more currencies from the second configuration 170b of the second cloud-based software application 130b. The removal of the second database table may be erroneous if the first database table storing the currency exchange rates remains a part of the second configuration 170b of the second cloud-based software application 130b such that the second cloud-based software application 130b is still configured to perform exchange rate conversions between different currencies.

In some example embodiments, the transport controller 150 may be configured to verify a transport request before the one or more customizations included in the transport request are deployed to the production system 120. For example, the transport controller 150 may be configured to determine, for instance, whether one or more errors are present in the transport request that would prevent the one or more customizations from being successfully deployed to the production system 120.

As shown in FIG. 1, the transport controller 150 may be deployed at the production system 120 to verify one or more transport requests received from the development system 110 before the customizations included in these transport requests are deployed to the production system 120. However, it should be appreciated that the transport controller 150 may be deployed elsewhere. For example, the transport controller 150 may be deployed at the development system 110 in order to verify the one or more transport requests prior to sending the transport requests to the production system 120. Alternatively and/or additionally, the transport controller 150 may be deployed as a remote service that is accessible to the development system 110 and the production system 120 via the network 160. As such, transport requests from the development system 110 may be sent, via the network 160, to the transport controller 150 before being verified and forwarded, via the network 160, for deployment at the production system 120.

As noted, the transport controller 150 may be configured to verify a transport request including, for example, by determining whether one or more errors are present in the transport request to prevent the one or more customizations included in the transport request from being successfully deployed to the production system 120. For example, the one or more errors may include an absence and/or removal of dependent data that is required for the cloud-based software application at the production system to operate in accordance with the customizations. The one or more errors may include an incomplete transport request that contains a first data required by the cloud-based software application to perform a functionality but not a second data that is also required by the cloud-based software application to perform the functionality. Alternatively and/or additionally, the one or more errors may include the removal of some but not all of the data required by the cloud-based software application to perform an existing functionality such that the cloud-based software application may be inadvertently prevented from performing the existing functionality.

In some example embodiments, the transport controller 150 may include a data dictionary 155 storing data dependencies such as, for example, the dependency between data in a first database table and data in a second database table. Alternatively and/or additionally, upon receiving a transport request from the development system 110, the transport controller 150 may request for and/or receive, from the development system 110, at least a portion of the data dictionary 155 that is associated with the transport request. The data dictionary 155 may include keys that maps entries from one database table to entries in another database table storing the dependent data. Accordingly, when verifying a transport request from the development system 110, the transport controller 150 may identify, based at least on the data dictionary 155, the dependent data that is required for the second cloud-based software application 130b to operate in accordance with the customizations. For instance, the transport controller 150 may determine, based at least on the data dictionary 155, that the dependent data the first database table storing currency exchange rates may include the second database table storing the definition of the underlying currencies.

In some example embodiments, the transport controller 150 may prevent the transport request from being deployed at the production system 120 if the transport controller 150 determines that the transport request includes errors such as, for example, the absence and/or the removal of dependent data required for the second cloud-based software application 130b at the production system 120 to operate in accordance with the customizations. For example, the transport controller 150 may prevent the deployment of a transport request that includes the first database table storing the currency exchanges rates but not the second database table storing the definition of the underling currencies.

Alternatively and/or additionally, the transport controller 150 may perform one or more remedial actions for correcting the errors that are present in the transport request. In some example embodiments, the transport controller 150 may perform remedial actions that correspond to a classification of the errors present in the transport request. For example, the transport controller 150 may classify the errors as a customer-based error, a non-customer based error, a technical error, and/or the like. When the transport controller 150 classifies the error as a customer-based error, the transport controller 150 may perform remedial actions that include sending, to the production system 120, a request to separately maintain the absent dependent data at the production system 120. For example, where the transport controller 150 determines that the error present in the transport request is a customer-based error, the transport controller 150 may send, to the production system 120, a request to separately maintain the second database table storing the definition of the currencies associated with the currency exchange rates stored in the first database table, which may be required for the deployment of the one or more customizations to the production system 120.

By contrast, if the transport controller 150 classifies the error as a non-customer based error, the transport controller 150 may attempt to locate the absent dependent data in a different transport request. If the absent dependent data cannot be located in a separate transport request, the transport controller 150 may send, to the development system 110, a request to modify the transport request to correct the errors that are present in the transport request. For instance, the transport controller 150 may request the development system 110 to extend the transport request to include the second database table storing the definition of the currencies associated with the currency exchange rates stored in the first database table. As noted, the definition of the currencies may be absent from the transport request but is required for the deployment of the one or more customizations to the production system 120.

Alternatively and/or additionally, the transport controller 150 may classify the error as a technical error, which may correspond to a critical software error at the development system 110. Accordingly, if the transport controller 150 determines that the error present in the transport request constitutes a technical error, the transport controller 150 may send, to the developer associated with the first client 140a, an alert message indicating the presence of the technical error. Furthermore, the transport controller 150 may respond to the presence of the technical error by at least enabling, at the development system 110, an automatic recording of the generation of transport requests at the development system 110.

Figure 2:
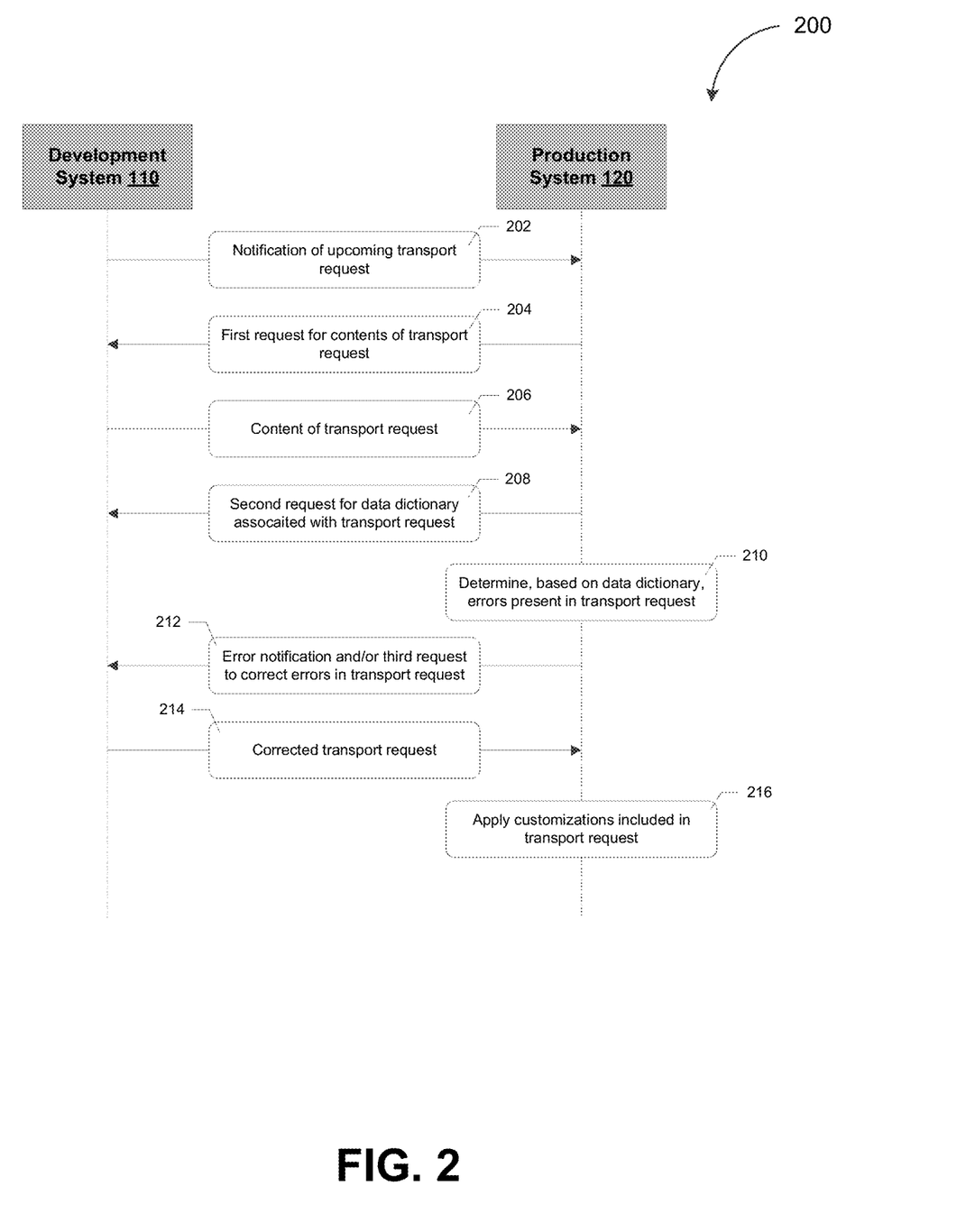
FIG. 2 depicts a sequence diagram illustrating a process for transporting customizations from a development system to a production system, in accordance with some example embodiments.

FIG. 2 depicts a sequence diagram illustrating a process 200 for transporting customizations from the development system 110 to the production system 120, in accordance with some example embodiments. Referring to FIGS. 1-2, the process 200 may be performed in order to deploy, at the production system 120, one or more customizations created at the development system 110. The one or more customizations may include changes to the second configuration 170b of the second cloud-based software application 130b in the production system 120. As such, deploying these customizations at the production system 120 may add, remove, and/or modify at least some of the functionalities of the second cloud-based software application 130b.

At 202, the development system 110 may send, to the production system 120, a notification of an upcoming transport request. For example, prior to sending a transport request to the production system 120, the development system 110 may send, to the production system 120, a notification of the upcoming transport request. The notification of the upcoming transport request may enable the production system 120, for example, the transport controller 150, to verify the transport request before deploying the transport request at the production system 120.

At 204, the production system 120 may respond to the notification by at least sending, to the development system 110, a first request for the contents of the transport request. For example, in some example embodiments, the transport controller 150 at the production system 120 may respond to the notification from the development system 110 by at least requesting the development system 110 to send, to the production system 120, the contents of the transport request. The transport request may include customizations changing the second configuration 170b of the second cloud-based software application 130b at the production system 120. As noted, the second cloud-based software application 130b may operate on data stored in one or more database tables. Accordingly, the contents of the transport request may include a database table that is being added to the second configuration 170b of the second cloud-based software application 130b such as, for example, a database table storing currency exchange rates to enable the second cloud-based software application 130b to perform exchange rate conversions between different currencies.

At 206, the development system 110 may respond to the first request from the production system 120 by at least sending, to the production system 120, the contents of the transport request. For example, the development system 110 may respond to the request from the production system 120 by at least sending, to the production system 120, the database table that is being added to the second configuration 170b of the second cloud-based software application 130b.

At 208, the production system 120 may respond to the receipt of the contents of the transport request by at least sending, to the development system 110, a second request for a data dictionary associated with the transport request. In some example embodiments, the transport controller 150 at the production system 120 may be configured to verify the transport request in order to determine whether the transport request includes errors that would prevent the customizations included in the transport request from being successfully deployed at the production system 120. The errors that may be present in the transport request may include an absence and/or a removal of dependent data that is required for the second cloud-based software application 130b to operate in accordance with the customizations. Accordingly, the transport controller 150 may determine, based at least on the data dictionary 155, whether errors are present in the transport request. As noted, the data dictionary 155 may identify data dependencies, for example, by including keys mapping entries from one database table to entries in another database table storing the dependent data. Moreover, according to some example embodiments, the transport controller 150 may be required to request, from the development system 110, at least a portion of the data dictionary 155 indicating the dependent data associated with the transport request.

At 210, the production system 120 may determine, based at least on the contents of the transport request and the data dictionary, that one or more errors are present in the transport request. In some example embodiments, the one or more errors may include an absence and/or removal of dependent data that is required for the second cloud-based software application 130b at the production system 120 to operate in accordance with the customizations included in the transport request. For example, the customizations created at the development system 110 may include the addition of a first database table storing exchange rates between different currencies. The transport controller 150 may determine, based at least on the data dictionary 155, the presence of an error in the transport request may if the second database table, which may store dependent data in the form of the definition of the currencies and is not already present at the production system 120, is absent from the transport request. Alternatively and/or additionally, the customizations created at the development system 110 may include a removal of the second database table storing the definition of one or more currencies from the second configuration 170b of the second cloud-based software application 130b. The transport controller 150 may determine, based at least on the data dictionary 155, that removal of the second database table constitutes an error if the first database table storing the currency exchange rates remains a part of the second configuration 170b of the second cloud-based software application 130b such that the second cloud-based software application 130b is still configured to perform exchange rate conversions between different currencies.

At 212, the production system 120 may send, to the development system 110, an error notification and/or a third request to correct the one or more errors present in the transport request. In some example embodiments, if the transport controller 150 determines that dependent data is absent from the transport request, the transport controller 150 may request for the development system 110 to extend the transport request to include the missing dependent data. For example, upon determining that the second database table storing dependent data in the form of the definition of the currencies is absent from the transport request, the transport controller 150 may request that the development system 110 modify the transport request to include the second database table such that the second cloud-based software application 130b is able to perform exchange rate conversions between different currencies based on the first database table storing the currency exchange rates and the second database table storing the definition of the currencies.

At 214, the development system 110 may respond to the third request by at least sending, to the production system 120, a corrected transport request. In some example embodiments, the development system 110 may send, to the production system 120, a transport request that has been extended to include the dependent data that is missing from the original transport request. For example, the development system 110 may extend the transport request to include the second database table such that the second cloud-based software application 130b is able to perform exchange rate conversions between different currencies based on the first database table storing the currency exchange rates and the second database table storing the definition of the currencies.

It should be appreciated that the production system 120 requesting that the development system 110 correct the one or more errors present in the transport request may be a type of remedial action that is performed by the transport controller 150 when the transport controller 150 determines that the errors present in the transport request are non-customer based and non-technical errors. As noted, where the transport controller 150 classifies the error as a customer based error, the transport controller 150 may perform a different remedial action that includes sending, to the production system 120, a request to separately maintain the absent dependent data at the production system 120. For example, if the error present in the transport request is a customer-based error, the transport controller 150 may send, to the production system 120, a request to separately maintain the second database table storing the definition of the currencies associated with the currency exchange rates stored in the first database table, which may be required for the deployment of the one or more customizations to the production system 120. Alternatively and/or additionally, where the transport controller 150 classifies the error as a technical error, the transport controller 150 may send, to the developer associated with the first client 140a, an alert message indicating the presence of the technical error. Furthermore, the transport controller 150 may respond to the presence of the technical error by at least enabling, at the development system 110, an automatic recording of the generation of transport requests at the development system 110.

At 216, the production system 120 may deploy, at the production system 120, the one or more customizations included in the corrected transport request by at least applying, to the second configuration 170b of the second cloud-based software application 130b at the production system 120, the one or more customizations included in the corrected transport request. In some example embodiments, applying the customizations at the production system 120 may change the second configuration 170b of the second cloud-based software application 130b, thereby adding, removing, and/or modifying at least some of the functionalities of the second cloud-based software application 130b. For example, the deploying the transport request at the production system 120 may change the second configuration 170b of the second cloud-based software application 130b to enable the second cloud-based software application 130*b* ability to perform exchange rate conversions between different currencies.

Figure 3:
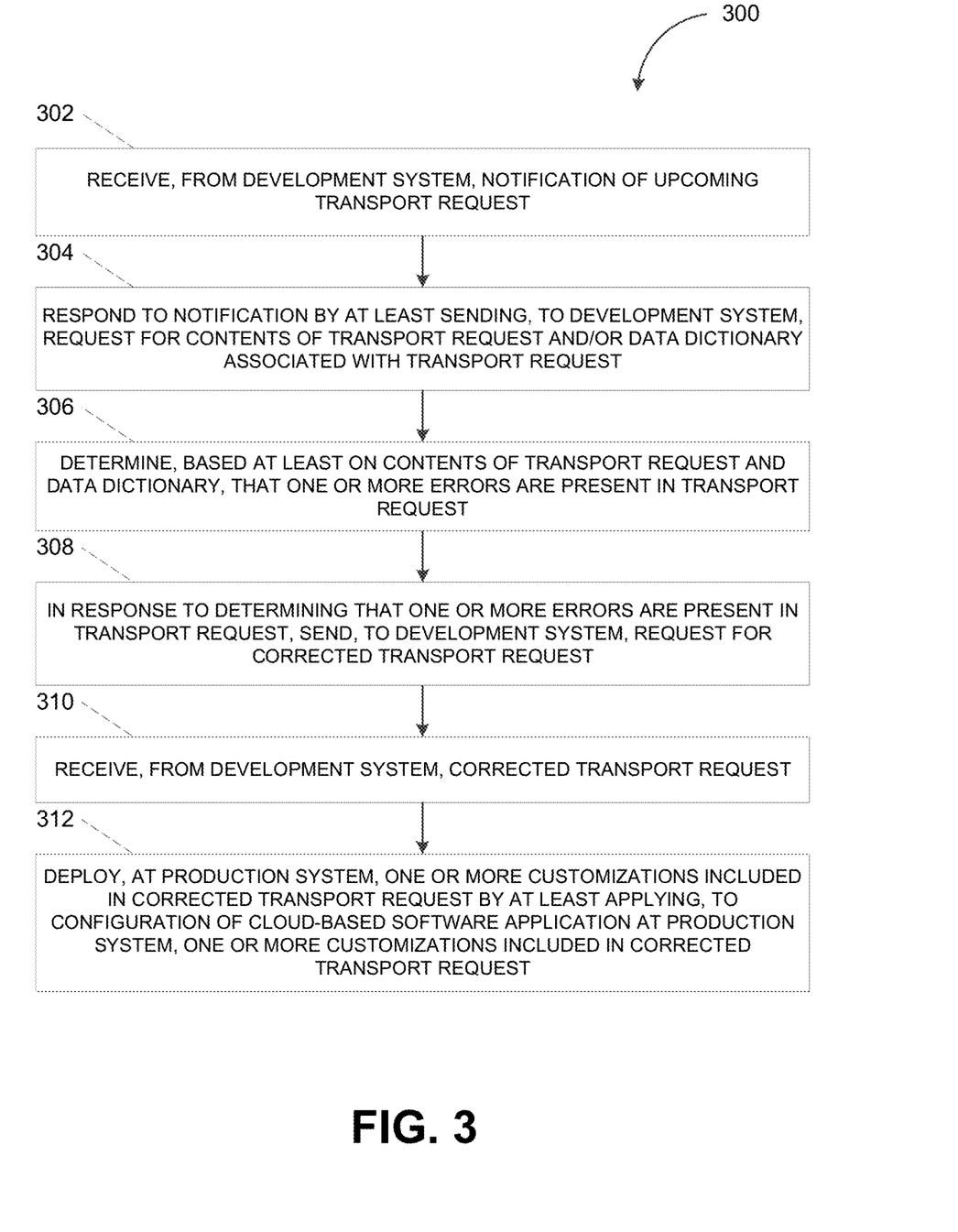
FIG. 3 depicts a flowchart illustrating a process for transporting customizations from a development system to a production system, in accordance with some example embodiments.

FIG. 3 depicts a flowchart illustrating a process 300 for transporting customizations from the development system 110 to the production system 120, in accordance with some example embodiments. Referring to FIGS. 1-3, the process 300 may be performed at the production system 120, for example, by the transport controller 150.

At 302, the transport controller 150 may receive, from the development system 110, a notification of an upcoming transport request. For example, the transport controller 150 at the production system 120 may receive, from the development system 110, a notification of an upcoming transport request prior to receiving the actual transport request.

At 304, the transport controller 150 may respond to the notification by at least sending, to the development system 110, a request for the contents of the transport request and/or a data dictionary associated with the transport request. In some example embodiments, the transport controller 150 at the production system 120 may respond to the notification from the development system 110 by at least requesting the development system 110 to send, to the production system 120, the contents of the transport request. The contents of the transport request may include, for example, a database table that is being added to the second configuration 170*b* of the second cloud-based software application 130*b*. For example, the database table that is being added to the second configuration 170*b* of the second cloud-based software application 130*b* may be a database table storing currency exchange rates to enable the second cloud-based software application 130*b* to perform exchange rate conversions between different currencies.

Alternatively and/or additionally, the transport controller 150 may respond to the notification of the upcoming transport request by at least sending, to the development system 110, a request for the data dictionary 155 associated with the transport request. The data dictionary 155 may identify the dependent data that is required for the second cloud-based software application 130*b* to operate in accordance with the customizations included in the transport request. For instance, the data dictionary 155 may identify data dependencies, for example, by including keys mapping entries from one database table to entries in another database table storing the dependent data. Accordingly, the transport controller 150 may request the data dictionary 155 from the development system 110 in order to enable the transport controller 150 to identify the dependent data that is required for the second cloud-based software application 130*b* to operate in accordance with the customizations included in the transport request.

At 306, the transport controller 150 may determine, based at least on the contents of the transport request and the data dictionary, that one or more errors are present in the transport request. In some example embodiments, the one or more errors may include an absence and/or removal of dependent data that is required for the second cloud-based software application 130*b* at the production system 120 to operate in accordance with the customizations included in the transport request. For example, the transport controller 150 may determine, based at least on the data dictionary 155, the presence of an error in the transport request may if the second database table, which may store dependent data in the form of the definition of the currencies, is absent from the transport request. This second database table may further be determined to be absent from the production system 120. Alternatively and/or additionally, the transport controller 150 may determine, based at least on the data dictionary 155, that the removal of the second database table storing the definition of the currencies constitutes an error if the first database table storing the currency exchange rates remains a part of the second configuration 170*b* of the second cloud-based software application 130*b* such that the second cloud-based software application 130*b* is still configured to perform exchange rate conversions between different currencies.

At 308, the transport controller 150 may respond to the presence of the one or more errors in the transport request by at least sending, to the development system 110, a request for a corrected transport request. In some example embodiments, if the transport controller 150 determines that dependent data is absent from the transport request, the transport controller 150 may request for the development system 110 to extend the transport request to include the missing dependent data. For example, when the second database table storing the definition of the currencies is determined to be absent from the transport request, the transport controller 150 may request that the development system 110 modify the transport request to include the second database table. The inclusion of the second database table in the transport request may enable the second cloud-based software application 130*b* to perform exchange rate conversions between different currencies based on the first database table storing the currency exchange rates and the second database table storing the definition of the currencies.

At 310, the transport controller 150 may receive, from the development system 110, the corrected transport request. For example, the transport controller 150 may receive, from the development system 110, a corrected transport request, which may include the second database table that enables the second cloud-based software application 130*b* to perform exchange rate conversions between different currencies.

At 312, the transport controller 150 may deploy, at the production system 120, the one or more customizations that are included in the corrected transport request by at least applying, to the second configuration 170*b* of the second cloud-based software application 130*b* at the production system 120, the one or more customizations included in the corrected transport request. As noted, applying the customizations at the production system 120 may change the second configuration 170*b* of the second cloud-based software application 130*b*, thereby adding, removing, and/or modifying at least some of the functionalities of the second cloud-based software application 130*b*. For example, the deploying the transport request at the production system 120 may change the second configuration 170*b* of the second cloud-based software application 130*b* to enable the second cloud-based software application 130*b* ability to perform exchange rate conversions between different currencies.

Figure 4A:
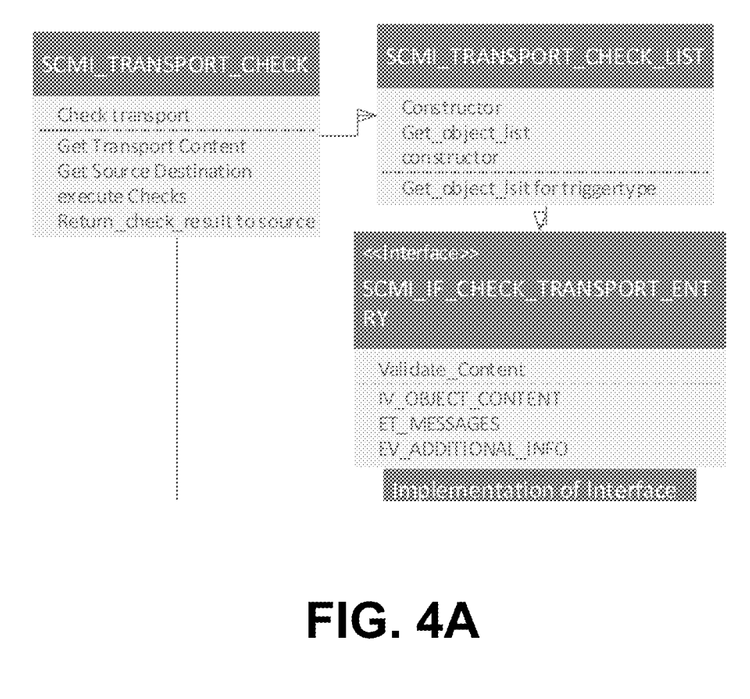
FIG. 4A depicts a class diagram illustrating objects associated with the transportation of customizations from a development system to a production system, in accordance with some example embodiments.
Figure 4B:
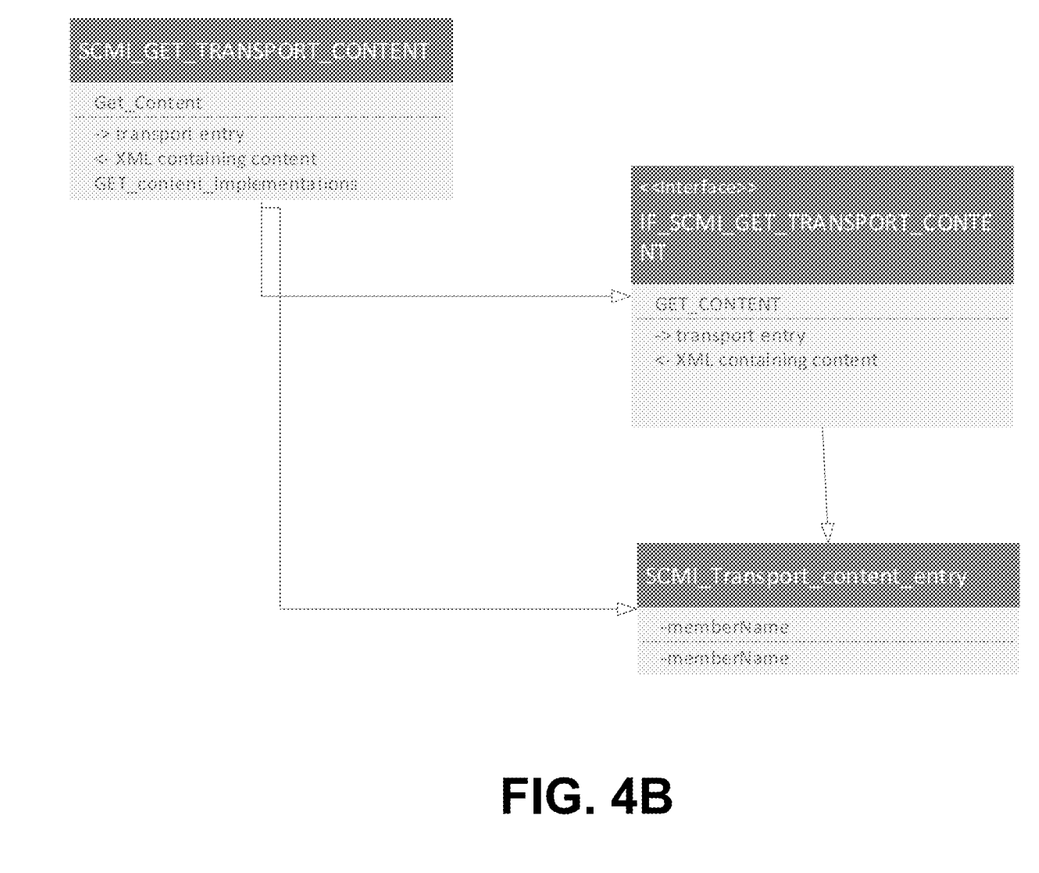
FIG. 4B depicts a class diagram illustrating objects associated with the transportation of customizations from a development system to a production system, in accordance with some example embodiments.

FIGS. 4A-B depict class diagrams illustrating objects associated with the transportation of customizations from the development system 110 to the production system 120, in accordance with some example embodiments.

Referring to FIGS. 1-3 and 4A-B, an SCMI_TRANSPORT_CHECK object is created when the development system 110 attempts to send, to the production system 120, a transport request to deploy one or more customizations created at the development system 110 to the production system 120. For instance, the SCMI_TRANSPORT_CHECK object may be created in response to the transport controller 150 at the production system 120 requesting the contents of the transport request and/or the data dictionary 155 associated with the transport request. As shown in FIGS.

4A-B, the SCMI_TRANSPORT_CHECK object may be associated with a public method check_transport, which may be invoked by the transport controller 150 at the production system 120 when requesting the contents of the transport request and/or the data dictionary 155.

In response to the transport controller 150 requesting the contents of the transport request and/or the data dictionary 155, for example, by invoking the public method check_transport, the SCMI_TRANSPORT_CHECK object may call the internal method get_source_destination to obtain an address (e.g., an Internet Protocol (IP) address, a media access control (MAC) address, and/or the like) of the production system 120. Moreover, the SCMI_TRANSPORT_CHECK object may call an internal method get_transport_content in order to obtain, from the production system 120, the contents of the transport request. As shown in FIGS. 4A-B, it should be appreciated that the get_transport_content method may interact with the interface IF_SCMI_GET_TRANSPORT_CONTENT to obtain the contents of the transport request from the production system 120. In some example embodiments, invocation of the internal method get_transport_content may further trigger the creation of a description of the contents of the transport request, which may include, for example, an Extensible Markup Language (XML) representation, a Hypertext Markup Language (HTML) representation, and/or a JavaScript Object Notation (JSON) representation of the contents of the transport request.

Referring again to FIGS. 4A-B, the SCMI_TRANSPORT_CHECK object may call the internal method execute_checks in order to verify the contents of the transport request. The internal method execute_checks may, in turn, create an SCMI_TRANSPORT_CHECK_LIST object. Meanwhile, the SCMI_TRANSPORT_CHECK_LIST object may be configured to verify the contents of the transport request, for example, by calling, via the interface SCMI_IF_CHECK_TRANSPORT_ENTRY, the execute_checks method of the SCMI_TRANSPORT_CHECK object. Upon completing the verification of the transport request, the SCMI_TRANSPORT_CHECK object may call the internal method return_check_result_to_source in order to send, back to the production system 120, a result of the verification of the transport request, which may include errors that are present in the transport request.

Figure 5:
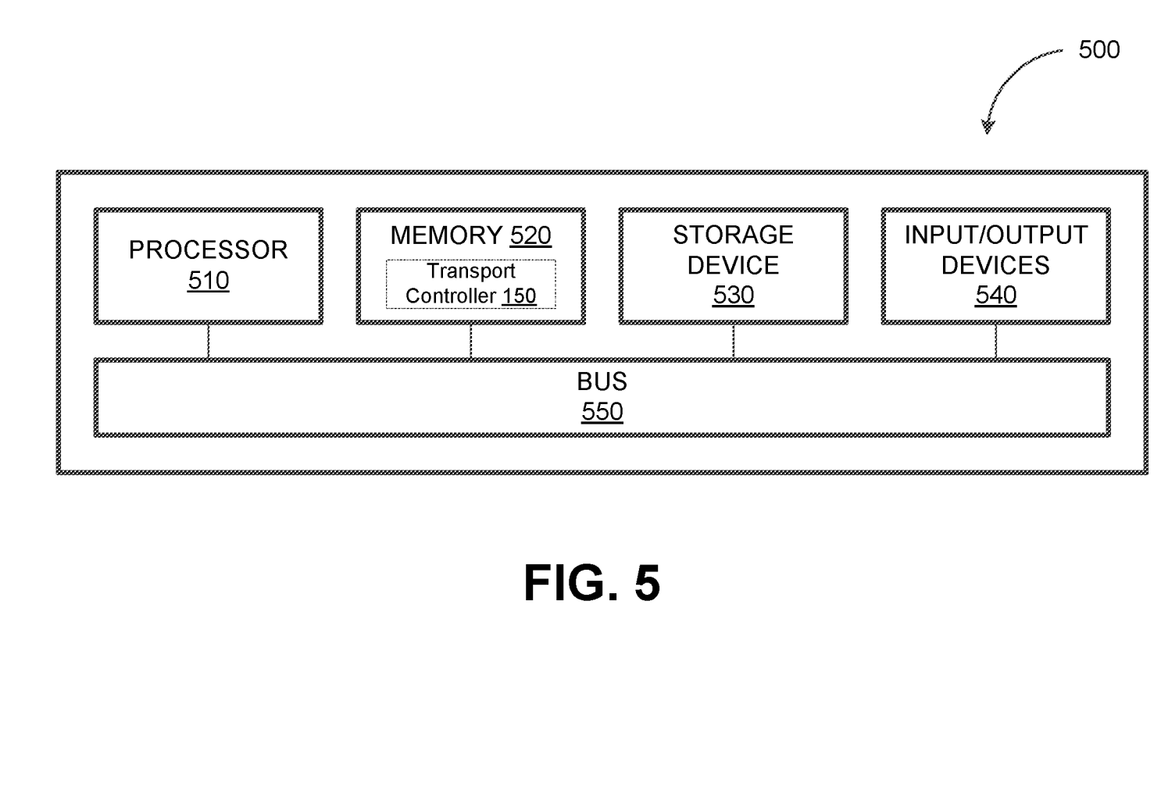
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-3, 4A-B, and 5, the computing system 500 can be used to implement the transport controller 150 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the transport controller 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:

receiving, at a production system, a notification of an upcoming transport request from a development system, the upcoming transport request including a customization to a software application hosted at the production system, the development system having a different configuration than the production system, and the customization includes removing, from the configuration of the software application, a first database table storing a first data, the first data enabling the software application to perform a functionality such that removing the first database table prevents the software application from performing the functionality;

in response to receiving the notification, sending, to the development system, a first request for a content of the upcoming transport request and a data dictionary in order to enable the production system to verify the upcoming transport request including the customization, the verification includes determining, based at least on the data dictionary, that one or more errors are present in the upcoming transport request, the data dictionary indicating a dependency between the first database table and a second database table storing a second data also required by the software application to perform the functionality, the one or more errors including the customization removing, from the configuration of the software application, the first database table but not the second database table such that the second database table remains a part of the configuration of the software application and the software application remains configured to perform the functionality associated with the first database table and the second database table;

in response to determining that the upcoming transport request removes the first database table, determining whether another version of the first database table is included in a separate transport request being sent to the production system;

in response to determining that the upcoming transport request removes the first database table and another version of the first database table is not included in the separate transport request, sending, to the development system, a second request for the development system to modify the upcoming transport request to prevent the removing of the first database table or to extend the separate transport request to include the another version of the first database table;

in response to determining that the upcoming transport request removes the first database table but another version of the first database table is included in the separate transport request, sending, to the development system, a third request for the development system to send the upcoming transport request;

receiving, at the production system, the upcoming transport request; and deploying, at the production system, the customization included in the upcoming transport request by at least applying, to a configuration of the software application, the customization included in the transport request.

2. The system of claim 1, wherein the customization is created based on another instance of the software application at the development system, and wherein the other instance of the software application is associated with a different configuration than the software application at the production system.

3. The system of claim 1, wherein the data dictionary stores the dependency between the first database table and the second database table.

4. The system of claim 3, wherein the data dictionary stores the dependency between the first database table and the second database table by at least storing keys mapping entries from the first database table to entries in the second database table.

5. The system of claim 1, wherein the software application further requires a third data in order to perform the functionality, and wherein the first request is sent to the development system further in response to determining that a third database table including the third data is absent from the production system.

6. The system of claim 1, wherein the software application performs the functionality by at least operating on the first data stored in the first database table and the second data stored in the second database table.

7. A computer-implemented method, comprising:
receiving, at a production system, a notification of an upcoming transport request from a development system, the upcoming transport request including a customization to a software application hosted at the production system, the development system having a different configuration than the production system, and the customization includes removing, from the configuration of the software application, a first database table storing a first data, the first data enabling the software application to perform a functionality such that removing the first database table prevents the software application from performing the functionality;
in response to receiving the notification, sending, to the development system, a first request for a content of the upcoming transport request and a data dictionary in order to enable the production system to verify the upcoming transport request including the customization, the verification includes determining, based at least on the data dictionary, that one or more errors are present in the upcoming transport request, the data dictionary indicating a dependency between the first database table and a second database table storing a second data also required by the software application to perform the functionality, the one or more errors including the customization removing, from the configuration of the software application, the first database table but not the second database table such that the second database table remains a part of the configuration of the software application and the software application remains configured to perform the functionality associated with the first database table and the second database table;
in response to determining that the upcoming transport request removes the first database table, determining whether another version of the first database table is included in a separate transport request being sent to the production system;
in response to determining that the upcoming transport request removes the first database table and another version of the first database table is not included in the separate transport request, sending, to the development system, a second request for the development system to modify the upcoming transport request to prevent the removing of the first database table or to extend the separate transport request to include the another version of the first database table;
in response to determining that the upcoming transport request removes the first database table but another version of the first database table is included in the separate transport request, sending, to the development system, a third request for the development system to send the upcoming transport request;
receiving, at the production system, the upcoming transport request; and
deploying, at the production system, the customization included in the upcoming transport request by at least applying, to a configuration of the software application, the customization included in the transport request.

8. The method of claim 7, wherein the customization is created based on another instance of the software application at the development system, and wherein the other instance of the software application is associated with a different configuration than the software application at the production system.

9. The method of claim 7, wherein the data dictionary stores the dependency between the first database table and the second database table.

10. The method of claim 9, wherein the data dictionary stores the dependency between the first database table and the second database table by at least storing keys mapping entries from the first database table to entries in the second database table.

11. The method of claim 7, wherein the software application further requires a third data in order to perform the functionality, and wherein the first request is sent to the development system further in response to determining that a third database table including the third data is absent from the production system.

12. A non-transitory computer-readable medium storing instructions, which when executed by at least one data processor, result in operations comprising:
receiving, at a production system, a notification of an upcoming transport request from a development system, the upcoming transport request including a customization to a software application hosted at the production system, the development system having a different configuration than the production system, and the customization includes removing, from the configuration of the software application, a first database table storing a first data, the first data enabling the software application to perform a functionality such that removing the first database table prevents the software application from performing the functionality;
in response to receiving the notification, sending, to the development system, a first request for a content of the upcoming transport request and a data dictionary in order to enable the production system to verify the upcoming transport request including the customization, the verification includes determining, based at least on the data dictionary, that one or more errors are present in the upcoming transport request, the data dictionary indicating a dependency between the first database table and a second database table storing a second data also required by the software application to perform the functionality, the one or more errors including the customization removing, from the configuration of the software application, the first database table but not the second database table such that the second database table remains a part of the configuration of the software application and the software application remains configured to perform the functionality associated with the first database table and the second database table;
in response to determining that the upcoming transport request removes the first database table, determining whether another version of the first database table is included in a separate transport request being sent to the production system;

in response to determining that the upcoming transport request removes the first database table and another version of the first database table is not included in the separate transport request, sending, to the development system, a second request for the development system to modify the upcoming transport request to prevent the removing of the first database table or to extend the separate transport request to include the another version of the first database table;

in response to determining that the upcoming transport request removes the first database table but another version of the first database table is included in the separate transport request, sending, to the development system, a third request for the development system to send the upcoming transport request;

receiving, at the production system, the upcoming transport request; and deploying, at the production system, the customization included in the upcoming transport request by at least applying, to a configuration of the software application, the customization included in the transport request.

* * * * *